US009917334B2

(12) United States Patent
Lee et al.

(10) Patent No.: US 9,917,334 B2
(45) Date of Patent: Mar. 13, 2018

(54) APPARATUS AND METHOD FOR SENSING SWELLING OF BATTERY

(71) Applicant: LG CHEM, LTD., Seoul (KR)

(72) Inventors: Taejoong Lee, Daejeon (KR); Dong Keun Kwon, Daejeon (KR); Ju Hyun Kang, Daejeon (KR)

(73) Assignee: LG CHEM, LTD., Seoul (KR)

(*) Notice: Subject to any disclaimer, the term of this patent is extended or adjusted under 35 U.S.C. 154(b) by 537 days.

(21) Appl. No.: 14/401,972

(22) PCT Filed: Jan. 16, 2014

(86) PCT No.: PCT/KR2014/000476
§ 371 (c)(1),
(2) Date: Nov. 18, 2014

(87) PCT Pub. No.: WO2015/012460
PCT Pub. Date: Jan. 29, 2015

(65) Prior Publication Data
US 2016/0268644 A1 Sep. 15, 2016

(30) Foreign Application Priority Data

Jul. 26, 2013 (KR) .................. 10-2013-0088802

(51) Int. Cl.
H01M 10/42 (2006.01)
H01M 10/48 (2006.01)
H01M 2/02 (2006.01)

(52) U.S. Cl.
CPC ..... *H01M 10/4257* (2013.01); *H01M 2/0277* (2013.01); *H01M 2/0285* (2013.01);
(Continued)

(58) Field of Classification Search
CPC .. H01M 10/42; H01M 10/48; H01M 10/4257; H01M 2/02; H01M 2/0285
See application file for complete search history.

(56) References Cited

U.S. PATENT DOCUMENTS

2007/0122691 A1* 5/2007 Lee .................. H01M 2/34
429/61
2014/0127549 A1 5/2014 Roh et al.

FOREIGN PATENT DOCUMENTS

EP 2 461 393 A1 6/2012
JP 2004-319463 A 11/2004
(Continued)

OTHER PUBLICATIONS

Chinese Office Action for Appl. No. 201480001456.8 dated Apr. 29, 2016 (w/ English translation).
(Continued)

*Primary Examiner* — Karie O'Neill Apicella
(74) *Attorney, Agent, or Firm* — Birch, Stewart, Kolasch & Birch, LLP

(57) ABSTRACT

Provided are an apparatus and a method for sensing swelling of a battery. According to an exemplary embodiment of the present invention, the apparatus for sensing swelling of a battery includes: a sensing circuit configured to be coupled to one side of a housing of the battery; a current sensing unit configured to sense whether a current is conducted between the sensing circuit and the other side of the housing of the battery; and a determination unit configured to determine whether the battery is swelled by the sensing.

17 Claims, 6 Drawing Sheets

(52) U.S. Cl.
CPC .......... *H01M 10/48* (2013.01); *H01M 10/488* (2013.01); *H01M 2200/20* (2013.01); *H01M 2220/20* (2013.01)

(56) References Cited

FOREIGN PATENT DOCUMENTS

| | | | | |
|---|---|---|---|---|
| JP | 2008-251437 A | | 10/2008 | |
| JP | 2008251437 A | * | 10/2008 | ............. H01M 2/34 |
| JP | 2009-76265 A | | 4/2009 | |
| JP | 2010-257647 A | | 11/2010 | |
| JP | 2012-243556 A | | 12/2012 | |
| JP | 2012243556 A | * | 12/2012 | .......... H01M 10/058 |
| KR | 10-0878702 B1 | | 1/2009 | |
| WO | WO 2013/015524 A1 | | 1/2013 | |

OTHER PUBLICATIONS

Japanese Office Action for Appl. No. 2015-528418 dated Dec. 1, 2015 (w/ English translation).
Written Opinion of the International Searching Authority (ISA) for Appl. No. PCT/KR2014/000476 dated May 8, 2014 (w/ English translation).
European Search Report for Appl. No. 14803031.5 dated Jan. 19, 2016.
Korean Office Action dated Apr. 21, 2015 for Appl. No. 10-2013-0088802 (w/ English translation).

* cited by examiner

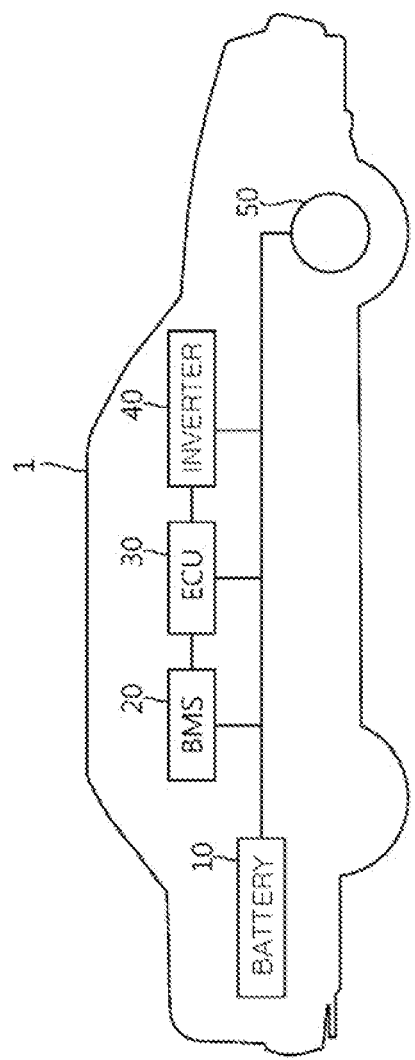
[Figure 1]

[Figure 2]
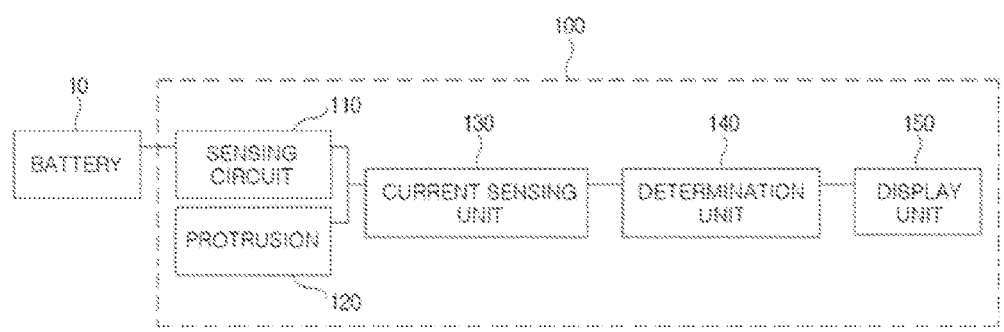

[Figure 3]
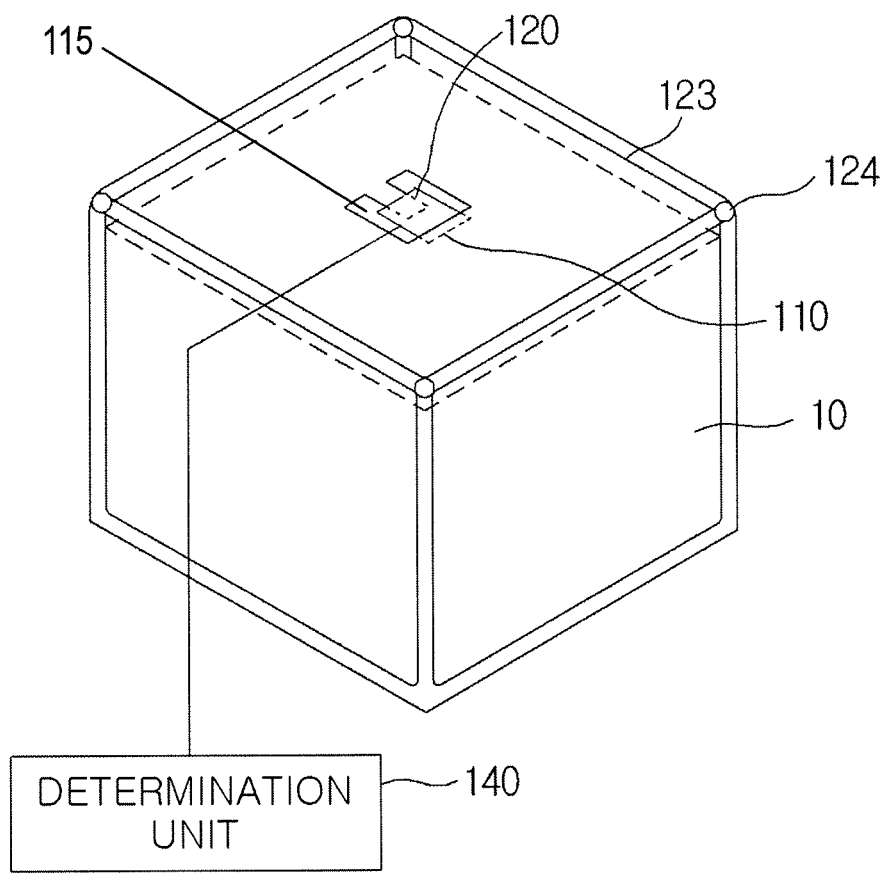

[Figure 4]
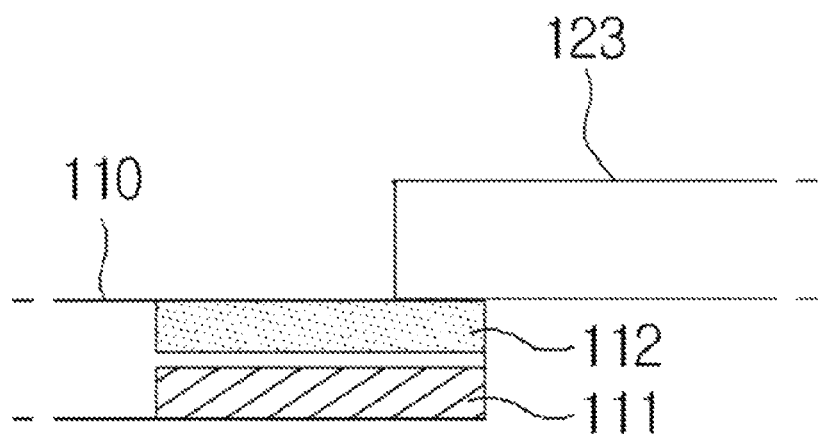
[Figure 5]
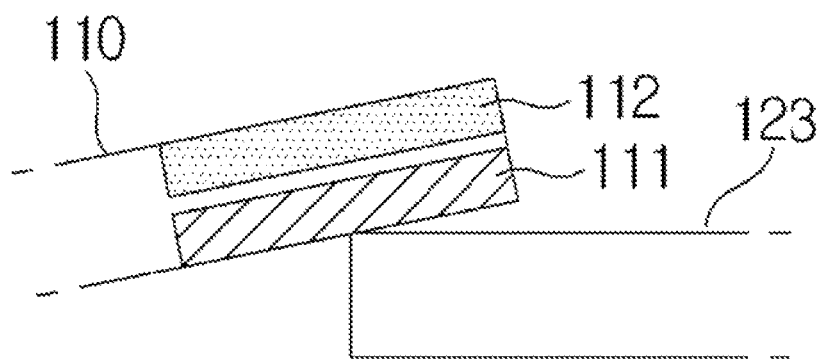

[Figure 6]
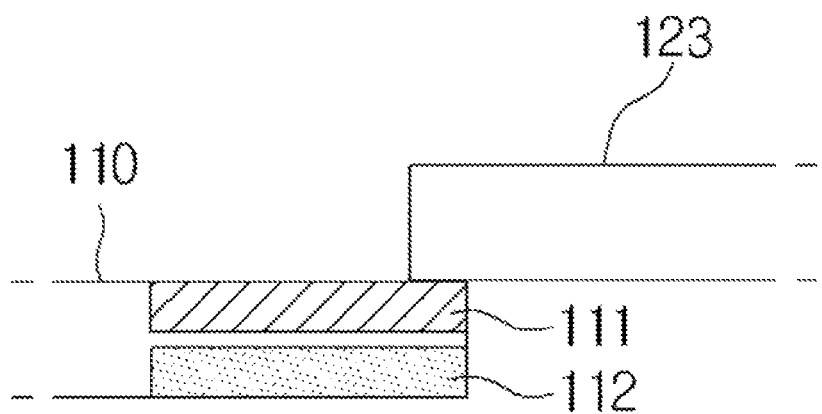
[Figure 7]
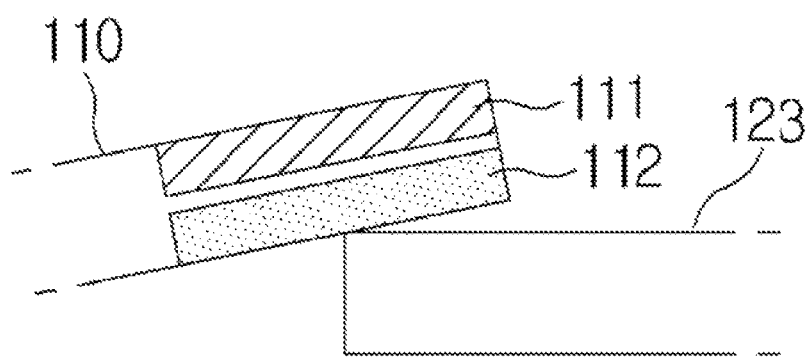

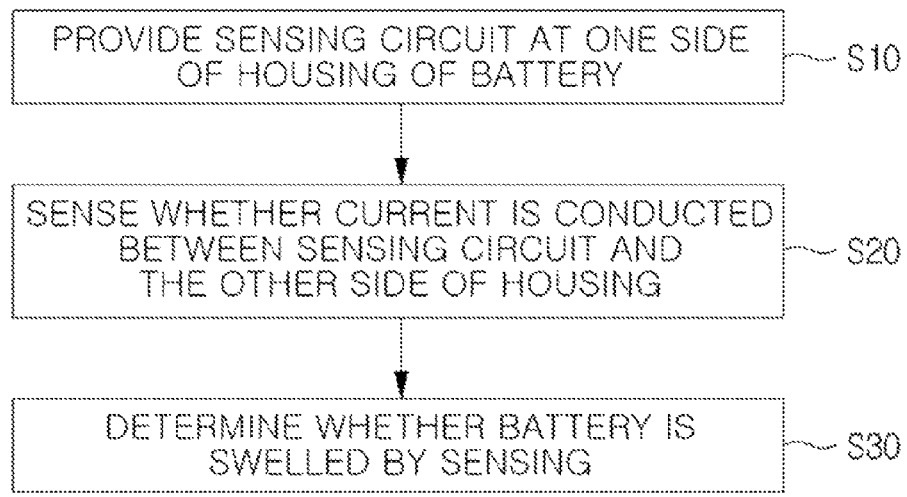
[Figure 3]

APPARATUS AND METHOD FOR SENSING SWELLING OF BATTERY

TECHNICAL FIELD

This application claims priority to and the benefit of Korean Patent Application No. 10-2013-0088802 filed in the Korean Intellectual Property Office on Jul. 26, 2013, the entire contents of which are incorporated herein by reference.

The present invention relates to an apparatus and a method for sensing swelling of a battery, and more particularly, to an apparatus and a method for sensing the swelling of a battery, in which the swelling of the battery is determined by sensing whether a current is conducted between a sensing circuit coupled to an inner surface of a housing of a battery and the outer surface of the housing of the battery which is formed to contact the sensing circuit, such that the swelling of the battery may be sensed only by a relatively simple structure instead of using various sensors having a complicated structure, thereby reducing a burden of expense due to additional equipment and minimizing an installation space to increase convenience and efficiency.

BACKGROUND ART

A secondary battery having easy applicability depending on a product group and electrical characteristics such as high energy density has been generally applied to an electric vehicle (EV) driven by an electrical driving source and a hybrid vehicle (HV) which are driven by an electrical driving source, an energy storage system (ESS) or an uninterruptible power supply (UPS) system which uses a medium-large size battery used for a household or industrial purpose, and the like, as well as portable devices.

The secondary battery may surprisingly reduce the use of fossil fuel and does not generate by-products due to the use of energy at all and therefore has received attention as a new energy source for enhancing environmentally-friendly characteristics and energy efficiency.

When the secondary battery is implemented as a battery for a portable terminal, and the like, the secondary battery may not necessarily be like that, but the battery applied to the electric vehicle, or the energy storage source as described above is generally used in a form in which a plurality of unit secondary cells is collected and thus has high suitability for high-capacity environment.

When the battery, in particular, a plurality of secondary batteries repeatedly carries out charging and discharging, it is necessary to manage the battery by efficiently controlling the charging and discharging of the battery so as to appropriately maintain the operation state and performance of the battery.

To this end, a battery management system (BMS) to manage the state and performance of the battery is provided. The BMS serves to detect the current, voltage, temperature, and the like of the battery, calculate a state of charge (SOC), equalize a cell voltage, detect and determine whether the battery is swelled, based on the detected current, voltage, and temperature of the battery, and cut-off a charging and discharging current by irreversibly disconnecting a line so as to protect a battery pack when abnormality of the battery is sensed.

Generally, the battery itself in the battery pack is vulnerable to safety, and even though the battery pack is configured to include a safety apparatus using various electronic components, safety accidents such as ignition, fuming, and explosion due to the problem of the battery pack occur.

Further, devices using the battery may be exposed to problems such as impact, overheating, overcharging, and a short circuit due to use environment and a behavior of a user, and under such circumstances, the battery may have a problem in stability and may cause ignition or explosion. Prior to the occurrence of the safety accidents, the battery involves a swelling phenomenon that the battery is swelled, and the explosion or the ignition of the battery may be sensed in advance based on the swelling phenomenon.

Therefore, a necessity to sense the swelling phenomenon of the battery has emerged, and therefore various sensing or detecting apparatuses have been devised.

In order for the apparatus for sensing swelling of a battery according to the related art to sense the swelling of the battery, a housing of the battery is provided with a pressure sensor, a temperature sensor, or the like, which are inefficient in an economical aspect and has a relatively complicated structure, such that the apparatus for sensing swelling of a battery may be expensive and may have an increased volume due to an additional space required for installation. Further, the sensors may be broken under high temperature and high pressure.

Therefore, the present inventors have contrived the present invention to solve the above-mentioned problems.

DETAILED DESCRIPTION OF THE INVENTION

Technical Problem

The present invention has been made in an effort to provide an apparatus and a method for sensing swelling of a battery, in which the swelling of the battery is determined by sensing whether a current is conducted between a sensing circuit contacting an inner surface of a housing of a battery and an outer surface of the housing of the battery which is formed to contact the sensing circuit, such that the swelling of the battery may be sensed only by a relatively simple structure instead of using various sensors having a complicated structure, thereby reducing a burden of expense due to additional equipment and minimizing an installation space to increase convenience and efficiency.

Technical Solution

An exemplary embodiment of the present invention provides an apparatus for sensing swelling of a battery, including: a sensing circuit coupled to an inner surface of a housing of the battery; a current sensing unit configured to sense whether a current is conducted between the sensing circuit and the outer surface of the housing of the battery; and a determination unit configured to determine whether the battery is swelled by the sensing.

The apparatus for sensing swelling of a battery may further include a protrusion formed at one side of an aperture in the housing of the battery and coupled to the sensing circuit.

The protrusion may be formed to protrude within a quadrangular hole at one side of the housing of the battery.

The housing of the battery may be made of a conductor.

An upper portion of the protrusion or a lower portion of the protrusion may be made of at least one material different from the other portion among insulating materials and conductive materials.

An upper portion of the sensing circuit and a lower portion of the sensing circuit may be made of at least one material different from the other portion among insulating materials and conductive materials.

The one side of the battery may be made of an insulator through which a current does not flow.

The upper portion of the sensing circuit may contact the inner surface of the housing, and the upper portion of the sensing circuit may be made of the insulating material and the lower portion of the sensing circuit may be made of the conductive material.

The determination unit may determine that the battery is swelled, when the lower portion of the sensing circuit contacts an outer surface of the housing by the swelling pressure of the battery such that the current sensing unit senses the flow of current.

The upper portion of the sensing circuit may contact the inner surface of the housing, and the upper portion of the sensing circuit may be made of the conductive material and the lower portion of the sensing circuit may be made of the insulating material.

The determination unit may determine that the battery is swelled, when the lower portion of the sensing circuit contacts the outer surface of the housing by the swelling pressure of the battery such that the current sensing unit does not sense the flow of current.

Another exemplary embodiment of the present invention provides a method for sensing swelling of a battery, including: coupling a sensing circuit to an inner surface of a housing of the battery; sensing whether a current is conducted between the sensing circuit and the outer surface of the housing of the battery; and determining whether the battery is swelled by the sensing.

In the coupling, a protrusion formed at one side of a quadrangular hole in the housing of the battery may be coupled to the sensing circuit.

The method for sensing swelling of a battery may further include forming the protrusion to protrude within a quadrangular hole at one side of the housing of the battery.

The housing of the battery may be made of a conductor.

An upper portion of the sensing circuit or a lower portion of the sensing circuit may be made of at least one material different from the other portion among insulating materials and conductive materials.

The one side of the battery may be made of an insulator through which a current does not flow.

The upper portion of the sensing circuit may contact the inner surface of the housing, and the upper portion of the sensing circuit may be made of the conductive material and the lower portion of the sensing circuit may be made of the insulating material.

In the determining, the swelling of the battery may be determined, when the lower portion of the sensing circuit contacts the outer surface of the housing by the swelling pressure of the battery such that a current sensing unit does not sense the flow of current.

The upper portion of the sensing circuit may contact the inner side of the housing, and the upper portion of the sensing circuit may be made of the insulating material and the lower portion of the sensing circuit may be made of the conductive material.

In the determining, the swelling of the battery may be determined, when the lower portion of the sensing circuit contacts the outer surface of the housing by the swelling pressure of the battery such that the current sensing unit senses the flow of current.

Advantageous Effects

According to the exemplary embodiments of the present invention, it is possible to provide the apparatus and the method for sensing swelling of a battery, in which the swelling of the battery is determined by sensing whether a current is conducted between the sensing circuit coupled to an inner surface of the housing of the battery and the outer surface of the housing of the battery which is formed to contact the sensing circuit, such that the swelling of the battery may be sensed only by a relatively simple structure instead of using various sensors having a complicated structure, thereby reducing a burden of expense due to additional equipment and minimizing an installation space to increase convenience and efficiency.

BRIEF DESCRIPTION OF DRAWINGS

FIG. 1 is a diagram schematically illustrating an electric vehicle to which an apparatus for sensing swelling of a battery according to an exemplary embodiment of the present invention may be applied.

FIG. 2 is a diagram schematically illustrating the apparatus for sensing swelling of a battery according to the exemplary embodiment of the present invention.

FIG. 3 is a perspective view schematically illustrating a structure of the apparatus for sensing swelling of a battery according to the exemplary embodiment of the present invention.

FIGS. 4 to 7 are diagrams illustrating an example inserted to explain a process of sensing a current by contacting a sensing circuit of the apparatus for sensing swelling of a battery according to the exemplary embodiment of the present invention with the outer surface of a housing of the battery.

FIG. 8 is a flow chart illustrating a method for sensing swelling of a battery according to an exemplary embodiment of the present invention.

BEST MODE

Exemplary embodiments of the present invention will be described in detail with reference to the accompanying drawings. The repeated descriptions and detailed descriptions related to publicly known functions or configurations, which may unnecessarily obscure the subject matter of the present invention, will be omitted herein. Exemplary embodiments of the present invention are provided to fully convey the concept of the invention to those skilled in the art. Therefore, in the drawings, shapes, dimensions, etc., of components may be exaggerated for clarity.

Throughout the present specification, unless otherwise described, "comprising" any components will be understood to imply the inclusion of another element rather than the exclusion of another element.

A term "unit" described in the specification means a unit of processing at least one function or operation and may be implemented by hardware or software or a combination of hardware and software.

FIG. 1 is a diagram schematically illustrating an electric vehicle to which an apparatus for sensing swelling of a battery according to an exemplary embodiment of the present invention may be applied.

FIG. 1 illustrates an example in which the apparatus for sensing swelling of a battery according to the exemplary embodiment of the present invention is applied to the electric vehicle, but it is possible to apply the apparatus for sensing swelling of a battery according to the exemplary embodiment of the present invention to any technical field to which the secondary battery may be applied, such as an energy storage system (ESS) or an uninterruptible power supply (UPS) system for a household or industrial purpose, in addition to the electric vehicle.

An electric vehicle 1 may be configured to include a battery 10, a battery management system (BMS) 20, an electronic control unit (ECU) 30, an inverter 40, and a motor 50.

The battery 10 is an electric energy source which supplies a driving force to the motor 50 to drive the electric vehicle 1. The battery 10 may be charged or discharged by the inverter 40 according to a driving of the motor 50 and/or an internal combustion engine (not illustrated).

Herein, a kind of the battery 10 is not particularly limited, and examples of the battery 10 may include a lithium ion battery, a lithium polymer battery, a nickel cadmium battery, a nickel hydrogen battery, a nickel zinc battery, and the like.

Further, the battery 10 is formed of a battery pack in which a plurality of battery cells is connected in serial and/or parallel. Further, the battery 10 may also be formed to include at least one battery pack.

The BMS 20 estimates a state of the battery 10 and uses the estimated state information to manage the battery 10. For example, the BMS 20 estimates and manages the state information of the battery 10 such as a state of charging (SOC), a state of health (SOH), a maximum input/output power allowable quantity, and an output voltage of the battery 10. Further, the charging or the discharging of the battery 10 may be controlled and a replacement time of the battery may also be estimated by using the state information.

Further, the BMS 20 according to the exemplary embodiment of the present invention may include a current sensing unit 130 and a determination unit 140 of an apparatus 100 (FIG. 2) for sensing swelling of a battery to be described below. The state of the battery 10 may be more accurately and closely sensed by the apparatus 100 (FIG. 2) for sensing swelling of a battery to prevent safety accidents such as ignition, fuming, and explosion.

The ECU 30 is an electronic control apparatus which controls a state of the electric vehicle 1. For example, the ECU 30 determines a torque level based on information of an accelerator, a brake, a speed, and the like and controls an output from the motor 50 to match the torque information.

Further, the ECU 30 transmits a control signal to the inverter 40 so that the battery 10 may be charged or discharged based on the state information such as the SOC and the SOH of the battery 10 which are transmitted from the BMS 20.

The inverter 40 charges or discharges the battery 10 based on the control signal from the ECU 30.

The motor 50 drives the electric vehicle 1 using the electric energy of the battery 10 based on the control information (for example, torque information) transmitted from the ECU 30.

The electric vehicle 1 is driven by using the electric energy of the battery 10, and therefore it is important to accurately estimate the state (for example, whether the battery is swelled) of the battery 10.

FIG. 2 is a diagram schematically illustrating the apparatus for sensing swelling of a battery according to the exemplary embodiment of the present invention, and FIG. is a perspective view schematically illustrating a structure of the apparatus for sensing swelling of a battery according to the exemplary embodiment of the present invention.

Hereinafter, the apparatus 100 for sensing swelling of a battery according to the exemplary embodiment of the present invention will be described in detail with reference to FIGS. 2 and 3.

The apparatus 100 for sensing swelling of a battery according to the embodiment of the present invention includes a sensing circuit 110, a protrusion 120, a current sensing unit 130, a determination unit 140, and a display unit 150.

The apparatus 100 for sensing swelling of a battery, which is illustrated in FIGS. 2 and 3, is based on an exemplary embodiment of the present invention, and the components thereof are not limited to the exemplary embodiment illustrated in FIGS. 2 and 3, and some of the components may be added, changed, or deleted, if necessary.

The sensing circuit 110 is coupled to an inner surface of a housing 123 of the battery 10.

Here, the sensing circuit 110 is coupled to an inner surface, which is a portion of the housing 123, and is positioned at a place where the sensing circuit 110 may contact the outer surface, which is a portion of the housing 123, and the top and bottom relationship between the sensing circuit 110 and the outer surface of the housing 123 may be changed depending on whether the battery 10 is swelled. For example, in a normal state in which the swelling of the battery 10 does not occur, an upper portion of the sensing circuit 110 may contact an inner surface of the housing 123. Alternatively, in a state in which the swelling of the battery occurs, the lower portion of the sensing circuit may contact the outer surface of the housing due to a swelling pressure of the battery 10.

In detail, when the swelling of the battery of which the volume is expanded due to overheating, overcharging, and other factors of the battery occurs, the sensing circuit 110 physically moves gradually in a swelling direction by receiving an expansion pressure of the battery 10 so as to be lifted to the outer surface of the housing 123 by the expansion pressure of the battery 10 in the state in which the sensing circuit 10 adheres to the outer surface of the housing 123, such that the sensing circuit 110 may be disposed on the outer surface of the housing 123.

Meanwhile, in the normal state in which the swelling of the battery 10 does not occur, the sensing circuit 110 may keep the state in which the sensing circuit 110 adheres to the inner surface of the housing 123 which is a contact target.

Further, the upper portion of the sensing circuit 110 or the lower portion of the sensing circuit 110 may be made of at least one material different from the other portion among conductive materials 111 and insulating materials 112.

As such, when the swelling of the battery 10 is progressed using anisotropy of the sensing circuit 110, a flow of current between the sensing circuit 110 and the side of the housing 123 may be sensed by the current sensing unit 130 due to various configurations to determine whether the sensing circuit 110 contacts the outer surface of the housing 123 or a mutual change in position occurs.

Herein, the conduction of current between the sensing circuit 110 and the outer surface of the housing 123 is variously analyzed depending on the configuration of the sensing circuit 110 using the anisotropy of the sensing circuit 110 and different results for the swelling determination of the battery 10 may be derived.

Therefore, the swelling of the battery 10 is determined by various exemplary embodiments, and thus the state of the battery may be more accurately understood.

The protrusion 120 is formed at one side of the housing 123 of the battery 10 and thus is configured to be coupled to the sensing circuit 110.

In detail, the protrusion 120 is a portion of the housing 123 and protrusion 120 is formed to protrude within a quadrangular hole 115 to easily contact the one side of the battery 10, such that the protrusion 120 may be bent in the swelling direction of the battery 10 from the direction of the housing 123 of the battery 10.

In this case, the protrusion 120 may be inserted into the sensing circuit 110. The sensing circuit 110 may be configured to be easily fixed and coupled to the protrusion 120 so that the sensing circuit 110 may be mounted or equipped in the protrusion 120.

According to the exemplary embodiment of the present invention, the sensing circuit 120 is configured as a part of the housing 123 of the battery 10. Therefore, the structure of the sensing circuit according to the exemplary embodiment of the present invention may be more simple and convenient than the structure of the sensing circuit 120 mounted using a separate attachment, thereby improving efficiency.

The outer surface of the housing 123 of the battery 10 is provided to contact the sensing circuit 110.

Herein, the outer surface of the housing 123 is a part of the housing 123 and may be configured to contact the sensing circuit 110. In detail, when the expansion pressure is applied, the outer surface of the housing 123 may easily contact the sensing circuit 110 in the vicinity of a quadrangular hole in which stress is relatively concentrated.

Further, the outer surface of the housing 123 of the battery 10 may be configured to appropriately contact the sensing circuit 110 when the one side of the battery 10 is swelled and moves, and therefore the shapes of holes or the shape or the number of the other sides of the housing 123 is not particularly limited.

However, according to the exemplary embodiment of the present invention, to sense a physical contact or a position change of the sensing circuit 110 and the outer surface of the housing 123 later, the outer surface of the housing 123 is formed of a conductor by using whether a current is conducted. Further, the housing 123 of the battery 10 is not provided with separate equipment and the housing 123 of the battery 10 may also be formed of a conductor in terms of the simple and effective configuration of the outer surface of the housing 123, which is a contact target of the sensing circuit 110, using the housing 123 of the battery 10.

The current sensing unit 130 serves to sense whether a current is conducted between the sensing circuit 110 and the outer surface of the housing 132 of the battery 10.

An operation principle of the current sensing unit 130 of the apparatus 100 for sensing swelling of a battery according to the exemplary embodiment of the present invention will be described below.

FIGS. 4 to 7 are diagrams illustrating an example inserted to explain a process of sensing a current by contacting between the sensing circuit of the apparatus for sensing swelling of a battery according to the exemplary embodiment of the present invention and the protrusion.

Referring to FIGS. 4 to 7, the sensing circuit 110 and the side of the housing 123 having the quadrangular hole are seen.

The apparatus 100 for sensing swelling of a battery illustrated in FIGS. 4 to 7 is based on an exemplary embodiment of the present invention, and the components thereof are not limited to the exemplary embodiment illustrated in FIGS. 4 to 7 and some of the components may be added, changed, or deleted, if necessary.

In detail, when the battery 10 is accommodated in the housing 123, the sensing circuit 110 generally adheres to the housing 123 because a space between the housing 123 of the battery 10 and the battery 10 is narrow.

In this case, when the sensing circuit 110 is applied with the expansion pressure due to the progress of the swelling of the battery 10, as the sensing circuit 110 may contact the inner surface of the housing 123 of the battery 10 or the mutual position therebetween may be changed to contact the sensing circuit 110 and the outer surface of the housing of the battery 10, such that an electrical signal is generated and is sensed by the current sensing unit 130 and is then transmitted to the determination unit 140.

The electrical signal may be generated by various configurations and methods of the sensing circuit 110 and the housing 123 and the exemplary embodiment of the apparatus 100 for sensing swelling of a battery illustrated in FIGS. 4 to 7 will be described below.

FIGS. 4 and 5 are diagrams illustrating the apparatus 100 for sensing swelling of a battery according to a first exemplary embodiment of the present invention.

Referring to FIG. 4, according to the first exemplary embodiment of the present invention, the upper portion of the sensing circuit 110 contacts the inner surface of the housing 123, and the upper portion of the sensing circuit 110 may be made of the insulating material 112 and the lower portion of the sensing circuit 110 may be made of the conductive material 111.

In this case, by the configuration to sense the current conduction between the sensing circuit 110 and the battery housing 123 using the anisotropy of the sensing circuit 110, in the case in which the space is narrow when the battery 10 is initially accommodated, the apparatus 100 for sensing the swelling of the battery 100 may be more efficiently configured.

According to the first exemplary embodiment of the present invention, the upper portion of the sensing circuit 110 made of the insulating material 112 adheres to the inner surface of the housing 123 made of the conductor prior to the occurrence of the swelling of the battery 10, but a current does not flow between the insulating material 112 and the conductor.

In this case, when the accommodated battery 10 is swelled due to overheating, overcharging, and other factors, the one side of the battery 10 which is installed in the swelling direction moves.

Herein, when the swelling occurs and thus the expansion of the battery 10 due to the swelling is uniform, if the expansion pressure is applied to the sensing circuit 110 by moving the one side of the battery 10, the sensing circuit 110, as illustrated in FIG. 5, moves in the swelling direction and thus is lifted to and disposed on the outer surface of the housing 123 of the battery 10, such that a flow of current is transitioned from the conductive material 111 of the lower portion of the sensing circuit 110 to the sensing circuit 110 made of the conductor, thereby making the current sensing unit 130 sense a flow of current.

In this case, it has been described that the upper portion or the lower portion of the sensing circuit 110 is made of the conductive material 111 or the insulating material 112, but it is to be noted that the portion which may contact the other portion of the battery 10 may be made of the conductive material 111 or the insulating material 112, and the portion may be configured in various forms.

FIGS. 6 and 7 are diagrams illustrating the apparatus 100 for sensing swelling of a battery according to a second exemplary embodiment of the present invention.

Referring to FIG. 6, according to the second exemplary embodiment of the present invention, the lower portion of the sensing circuit 110 may be made of the insulating material 112 and the upper portion thereof may be made of the conductive material 111.

The second exemplary embodiment of the present invention has a similar structure to the first exemplary embodiment of the present invention in that the anisotropy of the sensing circuit 110 is used, but has a slight difference from the first exemplary embodiment of the present invention in the sensing due to the change in the configuration of the upper and lower portions of the sensing circuit 110.

According to the second exemplary embodiment of the present invention, the upper portion of the sensing circuit 110 made of the conductive material 111 adheres to the housing 123 made of the conductor prior to the occurrence of the swelling of the battery 100, and therefore a current flows between the conductive material 111 and the conductor.

In this case, when the swelling occurs and thus the expansion pressure is applied to the sensing circuit 110, as illustrated in FIG. 7, the sensing circuit 110 moves in the swelling direction and thus is lifted to and disposed on the outer surface of the housing 123, which is disposed around the quadrangular hole, due to stress concentration, such that a current does not flow between the insulating material 112 of the lower portion of the sensing circuit 110 and the housing 123 made of the conductor, thereby making the current sensing unit 130 not sense the flow of current.

Similarly to the first exemplary embodiment of the present invention, it has been described that the upper portion or the lower portion of the sensing circuit 110 is made of the conductive material 111 or the insulating material 112, but it is to be noted that the portion which may contact the other portion of the battery 10 may be made of the conductive material 111 or the insulating material 112, and the portion may be configured in various focus.

Due to the operation principle and configuration, it is determined whether the current sensing unit 130 senses a current by the presence or absence of the contact between the sensing circuit 110 and the outer surface of the housing 123 of the battery 10 depending on whether the one side of the battery 10 moves or the contact direction. As a result, the sensing circuit 110 performs a switching function to perform a switching on/off and the current sensing unit 130 may be configured to easily sense the flow of current. As a result, an effect to sense the swelling of the battery 10 with a simple configuration is generated.

However, in order for the sensing circuit 110, which physically contacts the outer surface of the housing of the battery 10, to perform the switching function, the flow of current flowing in the sensing circuit 110 is generally determined based on whether the current is conducted to the outer surface of the housing 123, and therefore a part of the sensing circuit 110 and a part of the outer surface of the housing 123 may be made of the conductor.

Further, the current sensing unit 130 estimates the physical contact between the sensing circuit 110 and the protrusion 120 by the conduction of current, and therefore the one side of the battery 10 may be made of an insulator through which the current does not flow. By doing so, it is possible to more accurately sense whether the contact is made.

In this case, the current sensing unit 130 may be included in the battery management system (BMS) which is applied to the electric vehicle. In this case, the BMS serves to control and manage a high voltage battery which is equipped in the electric vehicle such as a hybrid vehicle and a fuel cell vehicle.

Referring back to FIGS. 2 and 3, the determination unit 140 is connected to the sensing circuit 110 to serve to determine whether the battery 10 is swelled by the sensing of the current sensing unit 130.

According to the first and second exemplary embodiments of the present invention, from when the sensing circuit 110 is accommodated in the housing of the battery 10, the space between the sensing circuit and inner surface of the housing is narrow, and thus the sensing circuit 110 adheres to the inner surface of the housing 123, which may be separately determined depending on whether the current is conducted by the configuration of the upper portion or the lower portion of the sensing circuit 110.

According to the first exemplary embodiment of the present invention, as illustrated in FIG. 4, in a case where the sensing circuit 110 adheres to the inner surface of the housing 123, when the current sensing unit 130 senses that a current does not flow between the sensing circuit 110 and the housing 123, and the sensing circuit 110 contacts the outer surface of the housing 123, such that the current sensing unit 130 senses the flow of current, the swelling of the battery 10 may be determined depending on the sensed result.

According to the second exemplary embodiment of the present invention, as illustrated in FIG. 5, in a case where the sensing circuit 110 adheres to the inner surface of the housing 123, when the current sensing unit 130 senses that a current flows between the sensing circuit 110 and the inner surface of the housing 123, and the sensing circuit 110 contacts the outer surface of the housing 123, such that the current sensing unit 130 senses no flow of current, the swelling of the battery 10 may be determined depending on the sensed result.

In this case, similarly to the current sensing unit 130, the determination unit 140 may be included in the battery management system (BMS) which is applied to the electric vehicle.

The display unit 150 serves to display whether the battery 10 is swelled depending on the determination of the determination unit 140.

According to the exemplary embodiment of the present invention, the display unit 150 may be configured to include at least one of a liquid crystal display (LCD) device, a light emitting diode (LED) device, a cathode-ray tube (CRT) device, a plasma display panel (PDP) device, and an organic light emitting diode (OLED) device.

Meanwhile, it is to be noted that the display unit 150 performing the above-mentioned function is not limited to the above-mentioned display devices.

In addition, the housing 123 of the battery 10 serves to accommodate and fix the battery 10.

Here, the protrusion 120 is formed at the one side of the quadrangular hole 115 of the battery 10 and thus may be coupled to the sensing circuit 110, and the outer surface of the housing 123 may be a contact target with the sensing circuit 110.

Further, a fixing part 124 may fix the housing 123 so that the upper portion of the battery 10 stacked when the battery 10 is swelled moves to contact the housing 123 of the battery 10.

Meanwhile, although the housing 123 of the battery 10 is illustrated and described in a cartridge type in FIG. 2, it is to be noted that the housing 123 of the battery 10 may be variously implemented as a pouch type, a can type, a small size, a medium-large size, and the like depending on the application form or the structure of the battery 10.

FIG. 8 is a flow chart illustrating a method for sensing swelling of a battery according to an exemplary embodiment of the present invention.

Referring to FIG. 8, when the method for sensing swelling of a battery according to the exemplary embodiment of the present invention starts, the inner surface of the housing of the battery is first coupled to the sensing circuit and the outer surface of the housing of the battery, which may contact the sensing circuit, is formed (S10). The process of step S10 may be performed by the sensing circuit 110, the protrusion 120, and the housing 123 of the battery in the apparatus 100 for sensing swelling of a battery, which are described with reference to FIGS. 2 and 3, and since the description thereof is applied hereto, the repeated description thereof will be omitted.

Next, it is sensed whether a current is conducted between the sensing circuit and the outer surface of the housing of the battery (S20). The process of step S20 may be performed by the current sensing circuit 130 in the apparatus 100 for sensing swelling of a battery, which is described with reference to FIGS. 2 to 5, and since the description thereof is applied hereto, the repeated description thereof will be omitted.

In this case, it is determined whether the battery is swelled by the sensing of the current sensing unit 130 (S30). The process of step S30 may be performed by the determination unit 140 in the apparatus 100 for sensing swelling of a battery, which is described with reference to FIGS. 2 and 3, and since the description thereof is applied hereto, the repeated description thereof will be omitted.

The aforementioned method for sensing swelling of a battery has been described with reference to a flow chart proposed in the drawings. For a simple description, the method is illustrated and described in a series of blocks, but the present invention is not limited to an order of the blocks, some blocks may be generated simultaneously with or in an order different from other blocks and ones illustrated and described in the present specification, and other various branches, a flow path, and an order of the blocks which achieve the same or similar results may be implemented. Further, all the blocks illustrated to implement the method described in the present specification may not be required.

Although specific exemplary embodiments of the present invention have been described as above and illustrated in the drawings, the technical spirit of the present invention is not limited to the accompanying drawings and the contents described above, it is obvious to those skilled in the art that the present invention can be modified and changed in various forms without departing from the spirit of the present invention, and it should be interpreted that all the equivalents to the present invention are included in the claims of the present invention without departing from the spirit of the present invention.

The invention claimed is:

1. An apparatus for sensing swelling of a battery, comprising:
    a housing, the housing having a first wall, the first wall having an inner surface, an outer surface and an aperture;
    a battery retained in the housing, the battery having an exterior surface;
    a sensing circuit having a first portion made of conductive material and a second portion of insulating material, the sensing circuit having a first position wherein an upper surface contacts the inner surface of the first wall and a second position wherein the sensing circuit extends through the aperture and a lower surface contacts the outer surface of the first wall;
    a current sensing unit configured to sense whether a current is conducted between the sensing circuit and the first wall of the housing; and
    a determination unit configured to determine whether the battery is swelled by sensing whether current is conducted by the sensing circuit.

2. The apparatus of claim 1, further comprising:
    a protrusion formed at one side of the housing of the battery and coupled to the sensing circuit.

3. The apparatus of claim 2, wherein the protrusion is formed to protrude within the aperture in the first wall of the housing.

4. The apparatus of claim 1, wherein the housing of the battery is made of a conductor.

5. The apparatus of claim 1, wherein first portion of the sensing circuit is made of conductive materials and forms the upper surface of the sensing circuit and the second portion of the sensing circuit is made of insulating materials and forms the lower surface of the sensing circuit.

6. The apparatus of claim 1, wherein the first portion of the sensing circuit is made of insulating materials and forms the upper surface of the sensing circuit and the second portion of the sensing circuit is made of conductive materials and forms the lower surface of the sensing circuit.

7. The apparatus of claim 1, wherein the determination unit determines that the battery is swelled, when the first portion of the sensing circuit contacts the outer surface of the first wall of the housing of the battery by the swelling pressure of the battery such that the current sensing unit senses the flow of current.

8. The apparatus of claim 1, wherein the determination unit determines that the battery is swelled, when the second portion of the sensing circuit contacts the outer surface of the first wall of the housing by the swelling pressure of the battery such that the current sensing unit does not sense the flow of current.

9. A method for sensing swelling of a battery, comprising:
    forming an aperture in a first side of a housing, the first side having an inner surface and an outer surface;
    retaining a battery in the housing;
    coupling a sensing circuit to the first side of a housing of the battery so that the battery is under the aperture;
    sensing whether a current is conducted between the sensing circuit and the housing of the battery; and
    determining whether the battery is swelled by the sensing.

10. The method of claim 9, wherein in the coupling, a protrusion formed at the first side of the housing of the battery is coupled to the sensing circuit.

11. The method of claim 10, further comprising:
    forming the protrusion to protrude within one side of the aperture.

12. The method of claim 9, wherein the housing of the battery is made of a conductor.

13. The method of claim 9, wherein an upper portion of the sensing circuit is made of at least one material different from a lower portion of the sensing circuit.

14. The method of claim 13, wherein the upper portion of the sensing circuit contacts the inner surface of the first side of the housing, and
    the upper portion of the sensing circuit is made of the conductive material and the lower portion of the sensing circuit is made of the insulating material.

15. The method of claim 14, wherein in the determining, the swelling of the battery is determined, when the lower portion of the sensing circuit contacts the outer surface of the first side of the housing of the battery by the swelling pressure of the battery such that the current sensing unit does not sense the flow of current.

16. The method of claim 13, wherein the upper portion of the sensing circuit contacts the inner surface of the first side of the housing of the battery, and the upper portion of the sensing circuit is made of the insulating material and the lower portion of the sensing circuit is made of the conductive material.

17. The method of claim 16, wherein in the determining, the swelling of the battery is determined, when the lower portion of the sensing circuit contacts the outer surface of the first side of the housing of the battery by the swelling pressure of the battery such that the current sensing unit senses the flow of current.

\* \* \* \* \*